United States Patent [19]
Borho et al.

[11] Patent Number: 5,965,986
[45] Date of Patent: Oct. 12, 1999

[54] ARRANGEMENT FOR DETECTING THE IGNITION OF A HIGH-PRESSURE GAS DISCHARGE LAMP

[75] Inventors: Lothar Borho, Willstaett; Klaus Eckert, Durbach Ebersweier; Robert Kern, Sasbachwalden, all of Germany

[73] Assignee: Robert Bosch GmbH, Stuttgart, Germany

[21] Appl. No.: 08/945,820

[22] PCT Filed: Feb. 6, 1997

[86] PCT No.: PCT/DE97/00220

§ 371 Date: Nov. 5, 1997

§ 102(e) Date: Nov. 5, 1997

[87] PCT Pub. No.: WO97/33455

PCT Pub. Date: Sep. 12, 1997

[30] Foreign Application Priority Data

Mar. 6, 1996 [DE] Germany .................. 196 08 649

[51] Int. Cl.[6] .................................................. H05B 37/02
[52] U.S. Cl. .................. 315/80; 315/82; 315/DIG. 7; 307/10.6
[58] Field of Search ............... 315/82, 80, 159, 315/362, DIG. 7; 307/10.6

[56] References Cited

U.S. PATENT DOCUMENTS

| | | | |
|---|---|---|---|
| 4,739,226 | 4/1988 | Murata | 315/82 |
| 4,803,406 | 2/1989 | Yasuda et al. | 315/DIG. 7 |
| 5,537,003 | 7/1996 | Bechtel et al. | 315/82 |
| 5,629,588 | 5/1997 | Oda et al. | 315/DIG. 7 |
| 5,663,613 | 9/1997 | Yamashita et al. | 315/DIG. 7 |

FOREIGN PATENT DOCUMENTS

| | | |
|---|---|---|
| 0411617 | 2/1991 | European Pat. Off. . |
| 4118977 | 12/1992 | Germany . |

*Primary Examiner*—Don Wong
*Assistant Examiner*—Wilson Lee
*Attorney, Agent, or Firm*—Venable; George H. Spencer; Norman N. Kunitz

[57] ABSTRACT

An arrangement for detecting the ignition of a high-pressure gas discharge lamp, in particular for use with a motor vehicle headlamp, comprising a circuit for supplying the high-pressure gas discharge lamp with burning energy, a control circuit and an ignition circuit. The ignition circuit is provided with an auxiliary voltage for the ignition. The control circuit is configured such that it detects the ignition of the high-pressure gas discharge lamp immediately via the behavior or the status of the auxiliary voltage ($U_H$). The control circuit can be provided with a microcontroller (20). The auxiliary voltage supplied during the ignition is connected to the microcontroller in such a way that the microcontroller detects the ignition without delay. For this, the auxiliary voltage is supplied via a voltage divider (22, 23, 24) with logic potential to the external interrupt input (21) of the microcontroller. The declining edge or the low voltage level developing during the ignition as a result of the collapse of the auxiliary voltage is detected immediately by the if microcontroller and is interpreted as ignition.

8 Claims, 2 Drawing Sheets

ARRANGEMENT FOR DETECTING THE IGNITION OF A HIGH-PRESSURE GAS DISCHARGE LAMP

STATE OF THE TECHNOLOGY

The invention is based on an arrangement for detecting the ignition of a high-pressure gas discharge lamp, in particular for use in a motor vehicle headlamp, of the type as wherein a circuit for supplying the high-pressure gas discharge lamp with burning energy, a control circuit as well as an ignition circuit are provided, and wherein the ignition circuit is provided with an auxiliary voltage for the ignition.

German published patent application No. 41 36 486 A1 shows that it is known to provide a series reactor for starting and operating alternating current high pressure gas discharge lamps, which reactor is fed from a direct voltage source, e.g., the battery of a motor vehicle. In this case, a stabilized and/or power-controlled direct voltage with a higher voltage value is initially generated from the direct voltage of the direct voltage source by means of a DC/DC converter. The alternating current necessary for the operation is subsequently generated from this voltage with the aid of a controlled full bridge circuit. The full bridge circuit can be operated with direct current as well as alternating current. The full bridge circuit is controlled by a control circuit, and an ignition device is provided for igniting the high-pressure gas discharge lamp.

The bridge circuit for this known series reactor is operated with direct current during the start-up. A signal is generated via a separate status determination device if the high-pressure gas discharge lamp has been ignited successfully. This signal is fed via a delay circuit to the control circuit of the full bridge circuit and ensures that the full bridge circuit is switched from the direct current operation to the alternating current operation, but only after the predetermined delay time has passed. The delay in the switching following ignition of the supply for the high-pressure gas discharge lamp with burning energy can lead to an overload, particularly for a hot or even only warm high-pressure gas discharge lamp.

In commercially available high-pressure gas discharge lamps, in particular for use in motor vehicle headlamps, it is known that the ignition of the high-pressure gas discharge lamp can be detected via its current and voltage measurement. In that case, the current and voltage are interrogated cyclically with the so-called polling method, e.g. by a controller. Lag times develop at specific intervals as a result of this scanning, which lead to delays. Depending on the situation, these can have serious consequences.

SUMMARY AND ADVANTAGES OF THE INVENTION

The drawbacks of the prior art arrangements are generally overcome according to the present invention by an arrangement for detecting the ignition of a high-pressure gas discharge lamp, in particular for use in a motor vehicle headlamp, wherein: a circuit for supplying the high-pressure gas discharge lamp with burning energy, a control circuit as well as an ignition circuit are provided; the ignition circuit is provided with an auxiliary voltage for the ignition; and, the control circuit is designed such that it detects the ignition of the high-pressure gas discharge lamp essentially without delay via the behavior or the status of the auxiliary voltage supplied during the ignition.

In contrast to the prior art, the advantage of the arrangement according to the invention for detecting the ignition of a high-pressure gas discharge lamp as discussed above, is that detection of the ignition of the high-pressure gas discharge lamp is considerably faster, if not essentially immediate or essentially non-delayed. No involved circuit is necessary for detecting the ignition. In addition to the increase in actuality, this also results in advantageous cost savings.

This is primarily achieved in accordance with the invention in that the control circuit is designed such that it detects the ignition of the high-pressure gas discharge lamp essentially without delay via the behavior or the status of the auxiliary voltage supplied during the ignition.

Advantageous modifications and improvements of the basic arrangement are possible as a result of the additional measures disclosed and discussed.

In accordance with a particularly advantageous embodiment of the invention, the control circuit is provided with a microswitch and the auxiliary voltage supplied during the ignition is connected to the microcontroller in such a way that it detects the ignition of the high-pressure gas discharge lamp essentially without delay.

In a particularly useful embodiment of the invention, the microcontroller has an external interrupt input, onto which the auxiliary voltage supplied during the ignition is conducted for detecting the ignition.

One advantageous modification of this exemplary embodiment of the invention makes use of the fact that the auxiliary voltage collapses during the ignition process and the external interrupt input detects this collapse by means of the thereby declining edge, or the low level for the collapsed auxiliary voltage.

According to an alternative embodiment of the invention, which can be realized advantageously by means of an ASIC, in particular with respect to the hardware, the auxiliary voltage supplied during the ignition is connected to a provided switch via a differential element, such that the ignition of the high-pressure gas discharge lamp is detected essentially without delay when the auxiliary voltage collapses, and the switch turns off the auxiliary voltage.

Another, usable alternative embodiment of the invention, which can also be realized with low hardware expenditure, provides that the control circuit has a logic component, and that the auxiliary voltage supplied during the ignition is connected to the component such that this component essentially immediately detects the ignition of the high-pressure gap discharge lamp during the collapse of the auxiliary voltage. In accordance with an advantageous embodiment, the logic component is comprised of the series connection of a single-edge triggered D flip-flop and an AND gate.

For a particularly advantageous and practical embodiment of the invention, a voltage divider is provided in front of the control circuit input, in particular the external interrupt input of the microcontroller, by way of which the auxiliary voltage is supplied. The interrupt input thus maintains compatible, logical potential.

The invention is explained in more detail below with the aid of an embodiment shown in the drawing.

DETAILED DESCRIPTION OF THE PREFERRED EMBODIMENTS

Figure 1:
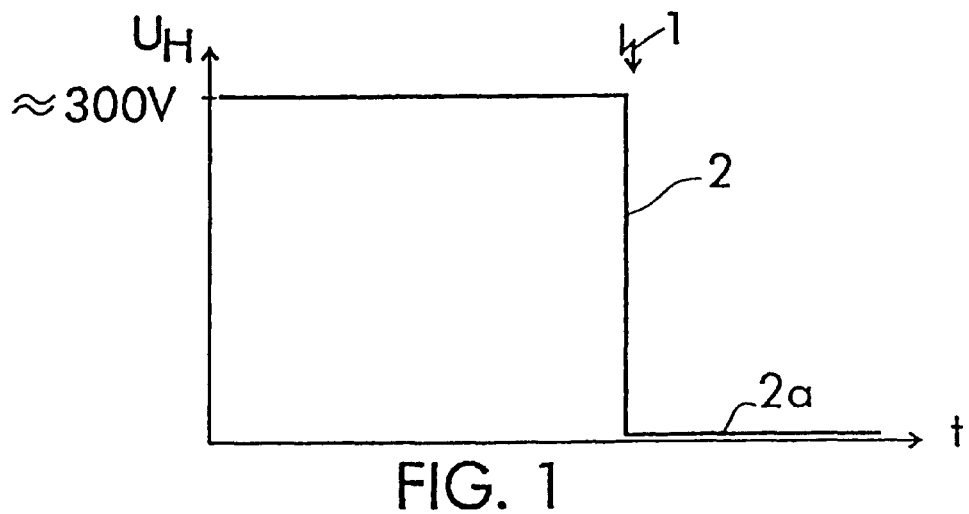
FIG. 1 is a diagram of the course of an auxiliary voltage provided during the ignition.

The course of an auxiliary voltage $U_H$ over the time t is shown diagrammatically in FIG. 1. This auxiliary voltage $U_H$ is fed during the ignition process to the ignition device of a high-pressure gas discharge lamp owing to its high ignition voltage requirement. The high-pressure gas discharge lamp, which can be provided in particular for use in a motor vehicle headlamp, together with its supply circuit for the burning energy, the control circuit and an ignition circuit are not shown in detail here. The ignition voltage required is extremely high when compared to the necessary burning voltage. The necessary supply voltage for the igniter can, for example, be approximately 450 V, while the operating voltage generally amounts to less than approximately 100 V. That is why an additional voltage $U_H$ as an auxiliary voltage is generated for the ignition and only for this process. Since this auxiliary voltage is needed only to initiate the ignition, it is a relatively high-impedance voltage source and consequently collapses very rapidly during the ignition, as illustrated in FIG. 1 by the arrow 1. The auxiliary voltage $U_H$ thus drops during the ignition 1 from a value of approximately 300 V to practically 0 V, or in general to a lower level 2a, thereby forming a very steep edge 2.

In accordance with the basic idea behind the invention, the control circuit, which is not shown in more detail, is designed such that it detects immediately the ignition of the high-pressure gas discharge lamp via the behavior or the status of the auxiliary voltage $U_H$ supplied during the ignition.

Figure 2:
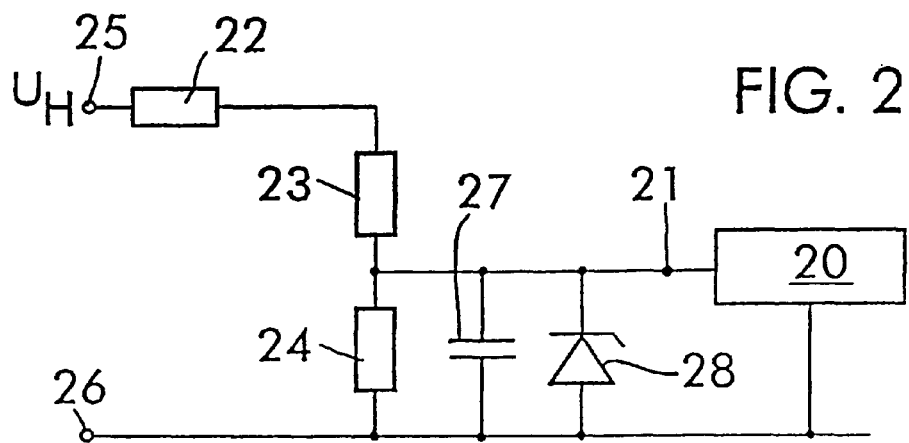
FIG. 2 is a circuit diagram of a first embodiment of the invention with external wiring of the external interrupt input of a microcontroller.

In accordance with the first embodiment of the invention shown in FIG. 2, the control circuit that is not shown in more detail is provided with a microcontroller 20. In accordance with the invention, the auxiliary voltage $U_H$, which is necessary only for initiating the ignition 1, is connected to the microcontroller 20 in FIG. 2 in such a way that this microcontroller can immediately detect the ignition. The microcontroller 20 has an external interrupt or external incident connection, the so-called external interrupt input 21. According to a practical embodiment of the invention, the auxiliary voltage supplied during the ignition is fed to this external interrupt input 21 for detecting the ignition. The auxiliary voltage $U_H$ collapses during the ignition process. It is advantageous if the external interrupt input 21 detects this collapse with the thereby dropping edge 2 in FIG. 1. As a result of this, the ignition is detected immediately because the auxiliary voltage principally behaves like an external interruption and is thus interpreted by the microcontroller 20. The microcontroller 20 could operate with both methods since the external interrupt input of a microcontroller generally can be adjusted to an edge as well as to the appearance of a specific static condition, e.g. the low-voltage level 2a in FIG. 1 of approximately 0 Volt.

FIG. 2 shows a circuit diagram of an external wiring for the external interrupt input 21 of the microcontroller 20. Since the interrupt input 21 of the microcontroller 20 is actually a digital input and thus can detect only logic "1" and "0" as well as the edges, the auxiliary voltage $U_H$ of a useful embodiment of the invention is conducted via a voltage divider onto the interrupt input 21. The voltage divider in the embodiment shown is comprised of the resistors 22, 23 and 24, which are connected in series between the connections 25 and 26. The auxiliary voltage $U_H$ is present at the connection 25, preferably as a positive voltage, and the connection 26 has zero potential. The interrupt input 21 is connected to the interconnection for the two resistors 23 and 24. A logic potential compatible with this input is present there, e.g. 5 V or 0 V. A capacitor 27 and a Z-diode 28 are arranged parallel to the resistor 24. On the one hand, these function to smooth the voltage conducted to the interrupt input 21 and, on the other hand, to protect against excess voltages.

Figure 3:
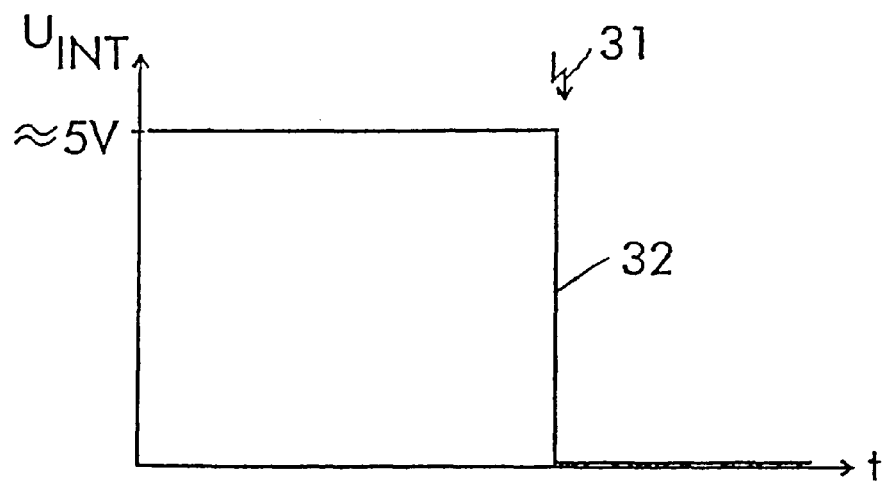
FIG. 3 is a diagram of the voltage course at the interrupt input, according to the arrangement in FIG. 2.

A diagram in FIG. 3 shows the voltage course at the interrupt input 21, $U_{int}$ during the time t. Until the point in time for detecting the ignition, shown with arrow 31, the voltage runs high with a value of approximately 5 V. During the ignition 31, the voltage $U_{int}$ practically collapses to the value 0 V by forming a steep edge 32. This collapse and the therewith associated steep, dropping edge 32 can be detected and immediately interpreted as ignition by the microcontroller 20.

Figure 4:
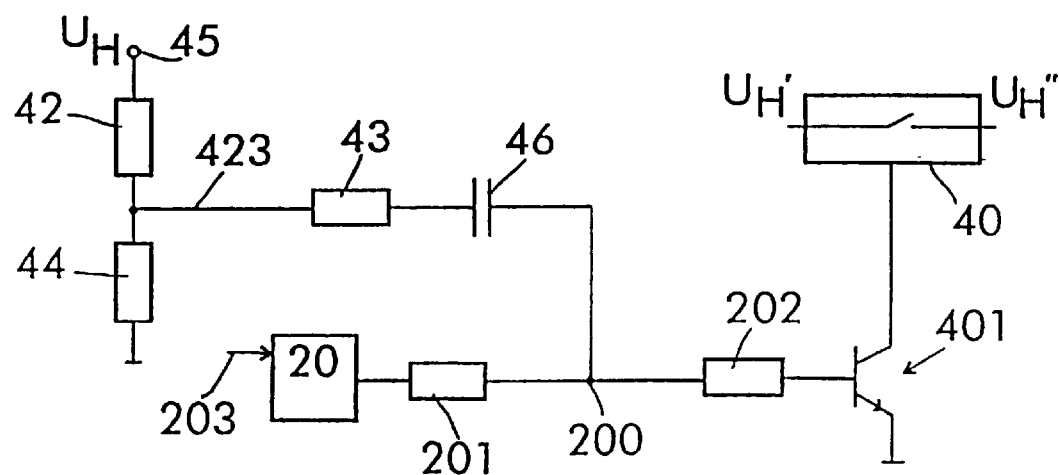
FIG. 4 is a circuit diagram of a second embodiment of the invention, with a differentiating element for detecting the ignition.

A second embodiment of the invention is illustrated in FIG. 4. The control circuit again comprises a microcontroller 20. The auxiliary voltage $U_H$ is supplied to an input 45 via a voltage divider composed of two resistors 42 and 44. The series connection of a resistor 43 and a capacitor 46 is connected to the tap 423 of the voltage divider. This in-series connection of resistor 43 and capacitor 46 forms a differentiating element. An output signal from the microcontroller 20 is supplied via a resistor 201 at the output 200 of this differentiating element. This signal "$U_{H\ on}$," which effects the start-up of the auxiliary voltage $U_H$, is conducted to the control input of a transistor 401, together with the output voltage for the differentiating element and via a resistor 202. Depending on its status, the transistor 401 switches a symbolically illustrated switch 40, with which the auxiliary voltage $U_H$ is actually switched on and switched off, as indicated by the references $U_H'$ and $U_H''$ at the input and output for switch 40.

Figure 5:
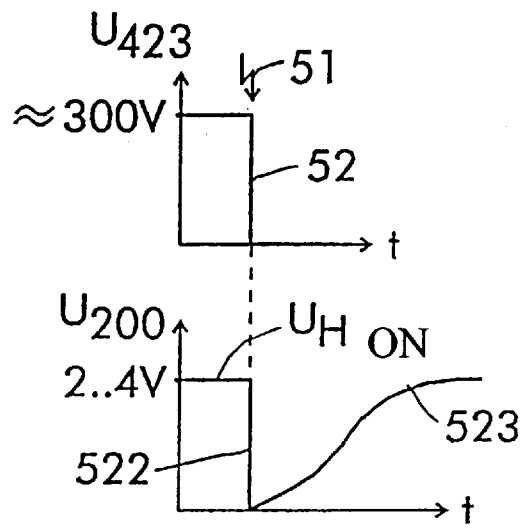
FIG. 5 shows the course of the auxiliary voltage and the differentiated voltage according to the arrangement in FIG. 4.

The upper diagram in FIG. 5 shows the course of the auxiliary voltage $U_H$ over the time t. The lower diagram in FIG. 5 shows the coordinated voltage course at the output 200 of the differentiating element over the time t. When an ignition event 51 occurs, the voltage $U_{423}$ at the input of the differentiating element drops abruptly with a steep edge 52 from the full value, e.g. 300 V, to practically the value of 0 Volt. The voltage $U_{200}$ present at the output 200 of the differentiating element, which corresponds to the signal "$U_{H\ on}$" and amounts to between 2 and 4 Volt, simultaneously drops from the full value to the value 0 with a steep edge 522.

The differentiating element according to the embodiment in FIG. 4 switches off temporarily and quickly. Its time constant is selected such that the microcontroller 20 can detect the ignition in another way, e.g., via a voltage, which is present at an input 203 and is interrogated cyclically, for example, through polling. As a result of this, the microcontroller 20 switches off its output signal "$U_{H\ on}$" before the differentiating element consisting of resistor 43 and capacitor 46 recharges and the transistor 401 is switched on once more. The course for the recharging is illustrated in the lower diagram in FIG. 5 with 523.

Figure 6:
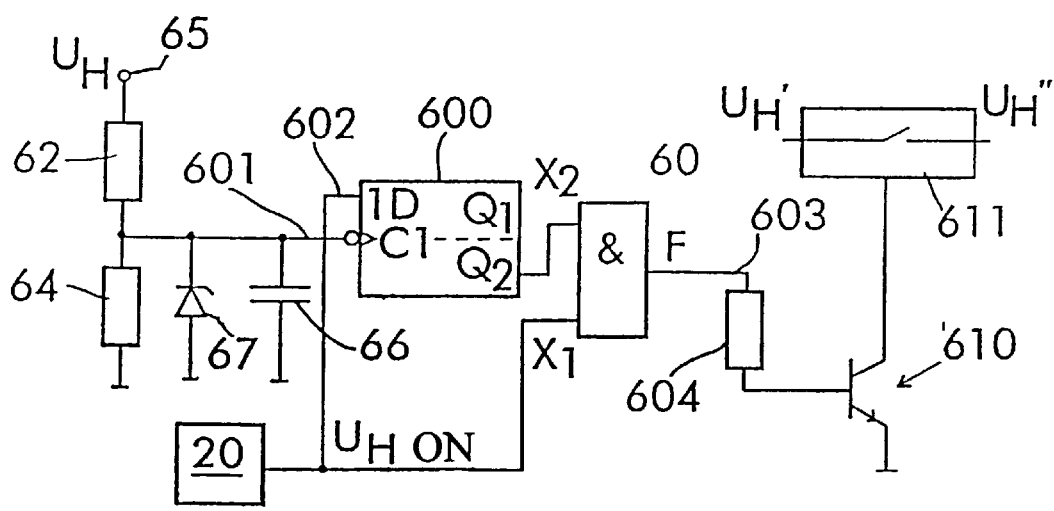
FIG. 6 A diagram of a third embodiment of the invention with logic component for detecting the ignition.

FIG. 6 illustrates a third embodiment of the invention, designed for detecting the ignition from the status or behavior of the supplied auxiliary voltage $U_H$. For this, there is provided a logic component which contains an AND gate 60 and a series-connected D flip-flop 600. A sequential logic in connection with a combinatory logic for detecting the ignition is formed through the single-edge triggered D flip-flop 600, for which the negative edge represents the point in time for switching, and by the AND gate 60. The logic component has an inverted input 601 at one input of the D flip-flop 600, as well as a non-inverted input 602, which forms the other input of the D flip-flop 600. For this embodiment, the $Q_2$ output of the D flip-flop 600 constitutes its output and is conducted as an input $x_2$ to the AND gate 60. The second input $x_1$ of the AND gate 60 is formed by the output of microcontroller 20 and with "$U_H$ on" indicates that the positive auxiliary voltage is switched on. The output signal with reference F on the output line 603 of the AND gate 60 is conducted via a resistor 604 that functions as a base resistor to the control input of a transistor 610. Corresponding to its state, the transistor 610 switches a symbolically illustrated switch 611, with which the auxiliary voltage $U_H$ is actually switched on and switched off. This is indicated by the references $U_H'$ and $U_H''$ at the input and output for switch 611.

The auxiliary voltage $U_H$ is supplied from an input 65 via a voltage divider composed of resistors 62 and 64 to the input 601 of the logic component. Parallel to the resistor 64 that is connected to the ground potential, a capacitor 66 for smoothing as well as a Z-diode 67 for avoiding excess voltages are provided, for which the second connection is at the inverted input 601 of the D flip-flop 600. The single-edge triggered D flip-flop truth table is as shown in the following table:

| case: | $t_n$<br>D | $t_{n+1}$<br>$Q_1$ |
|---|---|---|
| 1 | 0 | 0 |
| 2 | 1 | 1 |

The transfer function F of the AND gate 60 is explained in the following table. A control signal that switches off the transistor 610 and the switch 611 is present at the output 603 only if this is met.

| x1 | x2 | F |
|---|---|---|
| 0 | 0 | 0 |
| 1 | 0 | 0 |
| 0 | 1 | 0 |
| 1 | 1 | 1 | wherein x1="$U_{H\ on}$," auxiliary voltage U+ is switched on x2="$U_H$ ignition detected" output signal of the D flip-flop 600, which indicates the detection of the ignition in dependence on the switching state, and the transfer function F of the AND gate 60: F=x1∧x2.

For this embodiment, comprising the logic component D flip-flop 600 and the AND gate 60, it is relatively easy and simple to realize and integrate the additional hardware expenditure into an ASIC.

The detection of the ignition as configured according to the invention thus occurs for all embodiments shown in a simple and cost-effective way, without requiring special and expensive evaluation circuits.

We claim:

1. An arrangement for detecting the ignition of a high-pressure gas discharge lamp, in particular for use in a motor vehicle headlamp, wherein a circuit for supplying the high-pressure gas discharge lamp with burning energy, a control circuit as well as an ignition circuit for the lamp are provided; an auxiliary voltage for the ignition is provided only to the ignition circuit; and, the control circuit is designed such that it detects the ignition (1, 31, 51) of the high-pressure gas discharge lamp essentially without delay via the behavior or the status of the auxiliary voltage ($U_H$) that is supplied during the ignition (1, 31, 51).

2. An arrangement according to claim 1, wherein the control circuit is provided with a microcontroller (20) and the auxiliary voltage ($U_H$) supplied during the ignition (1, 31, 51) is connected to the microcontroller (20) such that the microcontroller detects the ignition (1, 31, 51) of the high-pressure gas discharge lamp essentially without delay from the auxiliary voltage.

3. An arrangement according to claim 2, wherein the auxiliary voltage ($U_H$) supplied during the ignition (51) is connected via a differentiating element (43, 46) to a provided switch (401, 40) such that the ignition (51) of the high-pressure gas discharge lamp is detected essentially without delay during the collapse of the auxiliary voltage ($U_H$) and the switch (401, 40) switches off the auxiliary voltage ($U_H$).

4. An arrangement according to claim 1, wherein the control circuit is provided with a logic component (60, 600) and the auxiliary voltage ($U_H$) supplied during the ignition (1, 31, 51) is connected to the logic component (60, 600) such a that this component essentially without delay detects the ignition (1, 31, Si) of the high-pressure gas discharge lamp w hen the auxiliary voltage ($U_H$) collapses.

5. An arrangement according to claim 4, wherein the logic component consists of the series connection of a single-edge triggered D flip-flop (600) and an AND gate (60).

6. An arrangement according to claim 2, wherein the microcontroller (20) has an external interrupt input (21), and the auxiliary voltage ($U_H$) supplied during the ignition (1, 31) is conducted to the external interrupt input (21) for detecting the ignition (1, 31).

7. An arrangement according to claim 2, wherein the auxiliary voltage ($U_H$) collapses during the ignition process (1, 31) and the external interrupt input (21) detects this collapse by means of the thereby declining edge (2, 32) or the low level (2a) of the collapsed auxiliary voltage ($U_H$).

8. An arrangement according to claim 1, wherein a voltage divider (22, 23, 24; 42, 44; 62, 64) is provided in front of the control circuit input, in particular the external interrupt input (21) of the microcontroller (20), by way of which the auxiliary voltage ($U_H$) is supplied.

\* \* \* \* \*